United States Patent
Black

(10) Patent No.: US 10,589,192 B1
(45) Date of Patent: Mar. 17, 2020

(54) FILTRATION GELS AND RELATED PROCESSES

(71) Applicant: Matrix Gels LLC, Aurora, CO (US)

(72) Inventor: Richard Ray Black, Aurora, CO (US)

(73) Assignee: MATRIX GELS LLC, Aurora, CO (US)

( * ) Notice: Subject to any disclaimer, the term of this patent is extended or adjusted under 35 U.S.C. 154(b) by 196 days.

(21) Appl. No.: 15/684,486

(22) Filed: Aug. 23, 2017

Related U.S. Application Data

(60) Provisional application No. 62/379,063, filed on Aug. 24, 2016.

(51) Int. Cl.

| | | |
|---|---|---|
| *B01D 17/02* | (2006.01) | |
| *C02F 1/40* | (2006.01) | |
| *C08K 13/02* | (2006.01) | |
| *C02F 1/52* | (2006.01) | |
| *B01D 37/03* | (2006.01) | |
| *C08K 5/053* | (2006.01) | |
| *B01D 24/16* | (2006.01) | |
| *B01D 17/04* | (2006.01) | |
| *B01D 24/00* | (2006.01) | |
| *C08K 3/105* | (2018.01) | |
| *C02F 103/10* | (2006.01) | |

(52) U.S. Cl.
CPC ........... *B01D 17/02* (2013.01); *B01D 17/045* (2013.01); *B01D 24/001* (2013.01); *B01D 24/16* (2013.01); *B01D 37/03* (2013.01); *C02F 1/40* (2013.01); *C02F 1/5236* (2013.01); *C08K 3/105* (2018.01); *C08K 5/053* (2013.01); *C08K 13/02* (2013.01); *C02F 2103/10* (2013.01)

(58) Field of Classification Search
CPC .... B01D 17/02; B01D 17/045; B01D 24/001; B01D 24/16; B01D 37/03; B01D 39/02; B01D 39/04; B01D 39/06; C02F 1/40; C02F 1/5236; C02F 2103/10; C08K 3/105; C08K 5/053; C08K 13/02
USPC .... 210/799, DIG. 5; 524/386, 389, 436, 437
See application file for complete search history.

(56) References Cited

U.S. PATENT DOCUMENTS 4,591,441 A * 5/1986 Sakai .................. B01D 17/045
210/307

FOREIGN PATENT DOCUMENTS

WO    WO-2015020746 A1 *  2/2015

\* cited by examiner

*Primary Examiner* — Matthew O Savage
(74) *Attorney, Agent, or Firm* — Lathrop GPM LLP

(57) ABSTRACT

Disclosed are systems and methods for waste water treatment. A filtration gel includes about 30-45% by weight poly(ethylene) oxide, about 30-40% by weight propylene glycol, about 10-20% by weight glycerin (at least 65% pure), about 5-10% by weight NaCl, about 1-5% by weight fumed silica, about 1-6% by weight silica dioxide, and about 0.5 to 5% calcium as mixed salts.

20 Claims, 2 Drawing Sheets

FILTRATION GELS AND RELATED PROCESSES

CROSS-REFERENCE TO RELATED APPLICATIONS

This application claims priority to U.S. Provisional Patent Application No. 62/379,063, filed Aug. 24, 2016, the entirety of which is incorporated herein by reference.

BACKGROUND

Fluids requiring treatment or filtration for further use exist in a number of different fields, ranging from the production of potable water, to dairy products, to paper goods. In order to reduce the amount of waste water and make efficient use of our natural resources, numerous techniques have been developed to treat and filter these fluids. However, these techniques have various drawbacks related to difficulty of operation, expense, and inefficiency.

One example of a fluid that requires treatment is slop oil. Slop oil is a mixture of oil, chemicals, and water that results from the drilling process. It is a concern at virtually every drilling site, as it is considered a hazardous waste. Upstream producers of oil strive to minimize the generation of slop oil, and have employed a number of different techniques to treat or otherwise dispose of these waste streams. Some methods include depositing the waste in a waste pit, which are now known to contaminate local groundwater due to seepage. Other methods include gravity settling, which is a slow and often ineffective process, and may further require the use of expensive chemicals and large quantities of storage space. Filter presses suffer due to the inability to treat large volumes of waste water. Finally, incineration is expensive and does not allow for the recovery of the individual components of the waste stream (e.g., water and oil).

It is desirable to have a system and method for treating all types of waste streams that is inexpensive and effective over a wide range of technologies.

SUMMARY

The following presents a simplified summary of the invention in order to provide a basic understanding of some aspects of the invention. This summary is not an exhaustive overview of the invention. It is not intended to identify critical elements of the invention or to delineate the scope of the invention. Its sole purpose is to present some concepts of the invention in a simplified form as a prelude to the more detailed description that is presented elsewhere herein.

In one embodiment, a filtration gel comprises about 30-45% by weight of a polyether, about 30-40% by weight of a diol, about 10-20% by weight of a polyol, about 5-10% by weight of a salt, about 1-5% by weight of a thickening agent, about 1-6% by weight silica dioxide, and about 0.5 to 5% calcium as mixed salts.

In another embodiment, a method of preparing a filtration gel, comprises the steps of: (a) mixing together about 30-45% by weight of a polyether, about 30-40% by weight of a diol, about 10-20% by weight of a polyol, about 5-10% by weight of a salt, about 1-5% by weight of a thickening agent, about 1-6% by weight silica dioxide, and about 0.5 to 5% calcium as mixed salts to form a putty; (b) depositing the putty into at least one waterproof bag; (c) subjecting the putty to a water bath at about 90° C. for about 1 hour to form a solid gel; (d) reconstituting the solid gel into a liquid by: (i) slicing the solid gel into thin slices; and (ii) marinating the solid gel slices in a solution containing aluminum oxide in an amount equal to about 35-45% of the weight of the solid gel slices, and water in an amount equal to about 10 g of water per gram of solid gel, wherein the gels and solution are mixed continuously for at least 24 hours to form a filtration gel solution; and (e) pumping the filtration gel solution into a treatment vessel to form a filtration gel matrix.

In still another embodiment, a method of filtering a waste stream, comprises the steps of (a) mixing, to form a filtration gel composition, about 30-45% by weight poly(ethylene) oxide, about 30-40% by weight propylene glycol, about 10-20% by weight glycerin, about 5-10% by weight NaCl, about 1-5% by weight fumed silica, about 1-6% by weight silica dioxide, and about 0.5 to 5% calcium as mixed salts; (b) depositing the filtration gel composition in one or more waterproof containers; (c) placing the waterproof container in a hot water bath, the hot water bath being at approximately 70-100 degrees Celsius to form a solid filtration gel; (d) slicing the solid filtration gel into a plurality of slices; (e) reconstituting the solid filtration gel as a liquid gel in a solution comprising aluminum oxide in an amount equal to about 40% of the gels; (f) pumping the reconstituted liquid through a pipe and into a treatment vessel such that the liquid gel unwinds to form a filtration gel matrix; (g) pressurizing the treatment vessel having the filtration gel matrix therein to about 0-50 psi; (h) pumping a waste stream through the treatment vessel, the waste stream being filtered through the filtration gel matrix such that the waste stream separates into an oil portion, a water portion, and a solids portion; and (i) separately removing the oil portion, water portion, and solids from the treatment vessel.

WRITTEN DESCRIPTION

Described herein are embodiments of methods and apparatus for treating waste streams. More particularly, described herein are filtration gels and methods of use which may be useful for filtering and treating waste streams. For simplicity, the description provided herein is directed to the treatment of slop oil and similar types of waste streams, though it shall be understood that this is exemplary in nature for the purpose of understanding the invention. The filtration gels and methods described herein may be useful for filtering and treating many types of fluids in any field of use.

As shall be recognized by the description provided herein, the filtration gels may provide an inexpensive and effective treatment option for treating waste streams. In the example provided herein, the filtration gels may act to separate useful oil from solids and other liquids in a waste stream. In accomplishing this task, the oil that is recovered may be marketed downstream, and the liquids may be repurposed as well. Significant economic advantages may thus be recognizes.

In one embodiment of the invention, a filtration gel includes a mixture of chemicals for treating waste streams. Broadly, the invention relates to a filtration gel comprised of a mixture that includes one or more of: polymers, solvents, alcohols, salts, liquids (e.g., water), etc. for treating waste streams. In one embodiment, the filtration gel includes a polymer compound such as poly(ethylene oxide) (PEO). In other embodiments, the polymer compound is selected from polyethylene glycol (PEG) and polyoxyethylene (POE). Other water soluble polymers and/or synthetic water soluble polymers may additionally, or alternately, be utilized as appropriate.

In one embodiment, the filtration gel includes about 30-45% by weight poly(ethylene) oxide, about 30-40% by weight propylene glycol, about 10-20% by weight glycerin (at least 65% pure), about 5-10% by weight NaCl, about 1-5% by weight fumed silica, about 1-6% by weight silica dioxide, and about 0.5 to 5% by weight calcium as mixed salts. Preferably, the filtration gel includes about 35-40% by weight poly(ethylene) oxide, about 35-40% by weight propylene glycol, about 10-15% glycerin (at least 65% pure), about 6-8% by weight NaCl, about 2-4% by weight fumed silica, about 1-3% by weight silica dioxide, and about 0.5-2% by weight calcium as mixed salts. Most preferably, the filtration gel includes about 36% by weight poly(ethylene oxide), about 37% by weight propylene glycol, about 11.8% by weight glycerin (at least 70% pure), about 7.2% NaCl, about 3% by weight fumed silica, about 2% by weight silica dioxide, and about 1% by weight calcium as mixed salts.

Figure 1:
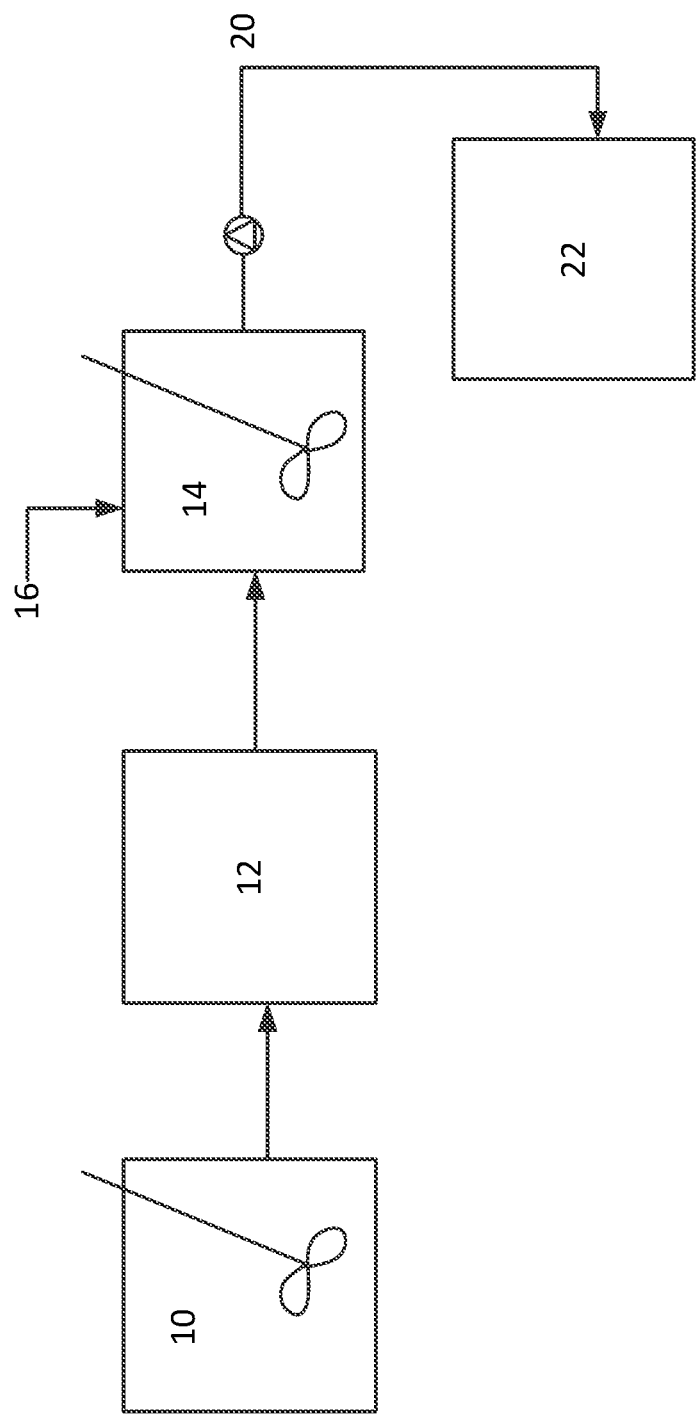
FIG. 1 is a flow diagram of a method of making a filtration gel according to an embodiment of the invention.

As illustrated in FIG. 1, the chemicals may be mixed in the appropriate amounts in a mixer 10 to form a filtration gel blend according to the methods described herein. The chemicals may be mixed together in a bread-type mixer, such as a spiral mixer, until well combined. Generally, dry ingredients (e.g., the silica, salts, etc.) may be first combined in the mixer 10, followed by the addition of the liquid ingredients. The use of a spiral mixer may mix the composition in such a way as to ensure a homogeneous mixture without overworking. The mixed composition may have a putty-like consistency.

Once combined, the mixture may be divided into portions and deposited in waterproof bags. The bags may then be placed in a hot water bath 12 for approximately one hour. The water for the hot water bath may be heated to approximately 80-100 degrees Celsius prior to receiving the bags. Preferably, the water may be heated to approximately 89-91 degrees C., and most preferably to about 90 degrees C. The water bath treatment changes the molecular formula of the composition, causing a solid "bar" to form. Once in the solid form, the bars may be stored for use.

In order to use the filtration gels, the solid form gels must be reconstituted back into a liquid form. In order to reconstitute the solid gels into a liquid form, the solid form gels may first be sliced into thin slices in order to maximize the surface area of the gels and to decrease the required reconstitution time. The solid form gels may be sliced with any machine capable of thinly slicing the gels. In one embodiment, the solid form gels may be sliced with a traditional commercial meat slicer, though other types of slicers may also be acceptable. The thinner the solid form gels are able to be sliced, the greater the surface area of the solid form gels. As the surface area of the solid-form gels increases, greater benefit from the gels may be achieved, as described in greater detail below.

Once the bars are cut into slices, the gels are reconstituted into a liquid form. The gels may be placed in a large mixing tank 14, for example, to effectuate the reconstitution. In one embodiment, the sliced solid form gels are allowed to marinate in a solution containing, for example, polyaluminum chloride (PAC) or zirconium for at least two hours until the gels are swelled. In another embodiment, the sliced solid form gels are mixed with a solution containing aluminum oxide in an amount equal to approximately 40% of the weight of the gels. The gels are allowed to soak for approximately two hours until the gels are swelled.

Once the gels have been allowed to marinate in the respective solution, water (represented by stream 16) may be added to the mixing tank 14, for example, approximately 10 grams of water for every gram of gel. In one embodiment, the water may first be treated to allow various types of fluids and multiple degrees of solids to be treated simultaneously with the gel filter. The water and gels may be continuously mixed for at least 24 hours to prepare the gels for application into a treatment vessel to treat waste streams.

Figure 2:
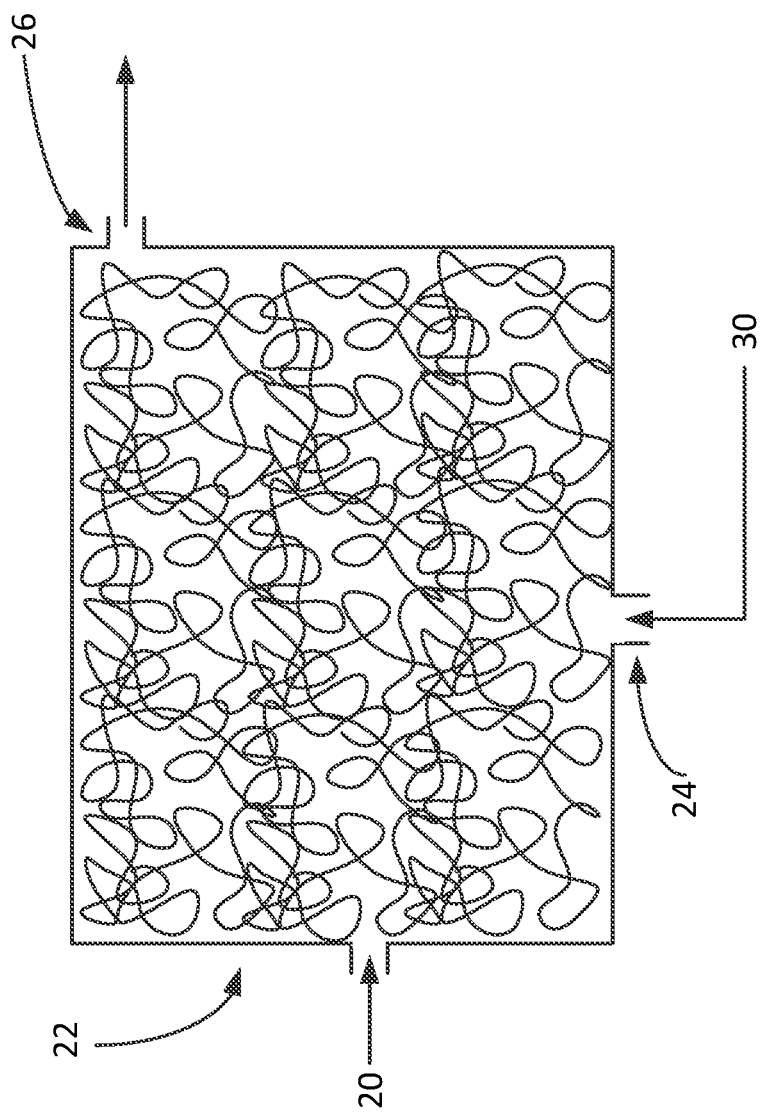
FIG. 2 shows a treatment vessel according to an embodiment of the invention.

After mixing with water for at least 24 hours, the gels are applied (e.g., pumped) into the treatment vessel 22, preferably via an in-line pipe (represented by stream 20). The pump may be, for example, a non-sheering pump, such as a diaphragm pump, in order to not cut the gels. The treatment vessel 22 may be any container that is adequate for receiving and treating the waste stream, and subsequently discharging the treated stream, such as an upright tank, vacuum truck, or a fracking tank. As the gels are pumped through the pipe, they unwind, thus creating a web-like microscopic filter (FIG. 2) once they reach the treatment vessel 22.

The in-line pipe may be sufficiently long to allow the gels to unwind before reaching the treatment vessel 22. For example, the pipe may be at least 20 feet, 40 feet, or longer. It is preferable for the length to be sufficient such that the gels are able to unwind and spread evenly throughout the vessel 22 to prevent clumping in the treatment vessel 22 (see FIG. 2). The pipes may preferably include turns, for example, 90 degree turns, to further aid with the unwinding of the gels. Once the gels are distributed in the treatment vessel 22 to form a gel matrix, the vessel 22 is ready to receive waste streams for treatment.

The waste stream 30 may be pumped into the treatment vessel 22 through the top or bottom of the vessel 22 via an inlet port 24. In some embodiments, it may be preferable for the liquid to be pumped into the bottom of the tank. In other embodiments, it may be desirable for the vessel to be further equipped with a mixing device to agitate the fluid and increase separation of the fluid into its various components, especially where the fluid is pumped through the top of the vessel.

Depending on the makeup of the waste stream 30, it may be desirable to flocculate the waste stream 30 prior to introducing the stream 30 in to the treatment vessel. This may be particularly desirable in instances where the waste stream 30 is light on solids. Accordingly, flocculants may optionally be added to the waste stream 30 to improve the sedimentation of small particles in the waste stream 30. Flocculants are well known to those in the art, and many types of flocculants may be appropriate for addition to the waste stream 30. Exemplary flocculants include but are not limited to natural flocculants such as starch derivatives, polysaccharides, and alginates; mineral flocculants such as activated silica and colloidal clays; and synthetic flocculants such as polyacrylamides. In an embodiment, the flocculent is potassium hydroxide, which may be provided in amounts equal to about 1-6% by weight, more preferably 1-3% by weight, and most preferably about 2% by weight.

Once the waste stream 30 is introduced into the vessel 22, pressure may be applied to the vessel 22 to increase the separation of the waste stream into its various components. The pressure applied to the treatment vessel may be in the range of 0-50 psi. As the waste stream 30 moves through the treatment vessel 22, the waste stream 30 may be separated into its various components for removal via one or more outlet ports 26. For example, the solids may settle to the bottom of the tank, where they may later be removed. The oil may separate from the water and other organics, and may rise to the top of the tank, where it may be removed and sold as useable oil. The water may additionally be removed, and may be further treated to reach potable water, or water that may be useful in other applications (e.g., for irrigation, etc.).

In one embodiment, the composition of the waste stream 30 may be such that it can be treated virtually as it enters the tank, only requiring one pass through the filtration gel matrix in the treatment vessel. In another embodiment, such as when the waste stream contains a large portion of solids, multiple passes through the filtration gels may be required. Where multiple passes are required, two separate treatment vessels may be preferable, wherein the waste stream is provided in a continuous flow from the first treatment vessel to the second treatment vessel and so forth. Slop oil and oil based drilling mud are two examples of waste streams that may benefit from multiple treatments with the filtration gels, although multiple treatments are not required.

A chemical charge may optionally additionally be introduced into the treatment vessel to further aid in the separation of the various components of the waste stream. Further, while the treatment vessel may be occasionally cleaned out in order to clean the tank, introduce a new gel filtration matrix, or to simply remove the separated waste stream, those of skill in the art may recognize that it may be beneficial to allow a small layer of oil to remain in the tank in order to provide means of attraction for the oil in subsequent waste streams. In other words, oil, being hydrophobic, repels water; however, oil molecules are attracted to each other.

In one example, surprisingly, the filtration gels separated a waste stream containing a mixture of at least solids, water, and oil into its various components. The mixture was introduced into a filtration vessel containing a gel matrix according to the invention. The oil separated from the water and the solids was tested according to methods known to those in the art. Centrifuge testing of the oil removed from the separation revealed at least 97% clean oil, and some tests revealed oil that was at least 99.9% clean.

Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention.

Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

The invention claimed is:

1. A filtration gel, comprising about 30-45% by weight of a polyether, about 30-40% by weight of a diol, about 10-20% by weight of a polyol, about 5-10% by weight of a salt, about 1-5% by weight of a thickening agent, about 1-6% by weight silica dioxide, and about 0.5 to 5% calcium as mixed salts.

2. The filtration gel of claim 1, wherein the polyether is poly(ethylene) oxide.

3. The filtration gel of claim 2, wherein the diol is propylene glycol.

4. The filtration gel of claim 3, wherein the polyol is glycerin.

5. The filtration gel of claim 4, wherein the salt is sodium chloride.

6. The filtration gel of claim 5, wherein the thickening agent is fumed silica.

7. The filtration gel of claim 3, wherein the polyol is at least 65% pure.

8. The filtration gel of claim 1, comprising about 34-40% by weight of the polyether, about 35-38% by weight of the diol, about 10-12% by weight of the polyol, about 6-8% by weight of the salt, about 2-4% by weight of the thickening agent, about 1-3% by weight silica dioxide, and about 0.5 to 2% calcium as mixed salts.

9. The filtration gel of claim 8, comprising about 36% by weight poly(ethylene) oxide as the polyether, about 37% by weight propylene glycol as the diol, about 11.8% by weight glycerin as the polyol, about 7.2% by weight sodium chloride as the salt, about 3.0% by weight fumed silica as the thickening agent, about 2.0% by weight silica dioxide, and about 1.0% by weight calcium as mixed salts.

10. The filtration gel of claim 9, wherein the glycerin is at least 70% pure.

11. A method of preparing a filtration gel, comprising the steps of:
  a. mixing together about 30-45% by weight of a polyether, about 30-40% by weight of a diol, about 10-20% by weight of a polyol, about 5-10% by weight of a salt, about 1-5% by weight of a thickening agent, about 1-6% by weight silica dioxide, and about 0.5 to 5% calcium as mixed salts to form a putty;
  b. depositing the putty into at least one waterproof bag;
  c. subjecting the putty to a water bath at about 90° C. for about 1 hour to form a solid gel;
  d. reconstituting the solid gel into a liquid by:
    i. slicing the solid gel into thin slices; and
    ii. marinating the solid gel slices in a solution containing aluminum oxide in an amount equal to about 35-45% of the weight of the solid gel slices, and water in an amount equal to about 10 g of water per gram of solid gel, wherein the gels and solution are mixed continuously for at least 24 hours to form a filtration gel solution; and
  e. pumping the filtration gel solution into a treatment vessel to form a filtration gel matrix.

12. The method of claim 11, wherein step (a) comprises mixing together about 36% by weight poly(ethylene) oxide as the polyether, about 37% by weight propylene glycol as the diol, about 11.8% by weight glycerin as the polyol, about 7.2% by weight sodium chloride as the salt, about 3.0% by weight fumed silica as the thickening agent, about 2.0% by weight silica dioxide, and about 1.0% by weight calcium as mixed salts.

13. The method of claim 11, wherein step (e) further comprises pumping the filtration gel solution into the treatment vessel via an in-line pipe, where the pipe comprises at least one 90 degree turn.

14. The method of claim 13, wherein the pump is a non-sheering pump.

15. A method of filtering a waste stream, comprising:
  mixing, to form a filtration gel composition, about 30-45% by weight poly(ethylene) oxide, about 30-40% by weight propylene glycol, about 10-20% by weight glycerin, about 5-10% by weight NaCl, about 1-5% by weight fumed silica, about 1-6% by weight silica dioxide, and about 0.5 to 5% calcium as mixed salts;

depositing the filtration gel composition in one or more waterproof containers;

placing the waterproof container in a hot water bath, the hot water bath being at approximately 70-100 degrees Celsius to form a solid filtration gel;

slicing the solid filtration gel into a plurality of slices;

reconstituting the solid filtration gel as a liquid gel in a solution comprising aluminum oxide in an amount equal to about 40% of the gels;

pumping the reconstituted liquid through a pipe and into a treatment vessel such that the liquid gel unwinds to form a filtration gel matrix;

pressurizing the treatment vessel having the filtration gel matrix therein to about 0-50 psi;

pumping a waste stream through the treatment vessel, the waste stream being filtered through the filtration gel matrix such that the waste stream separates into an oil portion, a water portion, and a solids portion; and separately removing the oil portion, water portion, and solids from the treatment vessel.

16. The method of claim 15, wherein the filtration gel composition about 36% by weight poly(ethylene) oxide, about 37% by weight propylene glycol, about 11.8% by weight glycerin, about 7.2% by weight sodium chloride, about 3.0% by weight fumed silica, about 2.0% by weight silica dioxide, and about 1.0% by weight calcium as mixed salts.

17. The method of claim 16, wherein the glycerin is at least about 70% pure.

18. The method of claim 16, wherein the waste stream is pumped through the bottom of the treatment vessel.

19. The method of claim 15, further comprising introducing a flocculent into the waste stream prior to pumping the waste stream through the treatment vessel.

20. The method of claim 16, wherein the oil portion removed from the treatment vessel is at least 95% clean oil.

* * * * *